United States Patent
Weaver et al.

(10) Patent No.: US 11,346,618 B1
(45) Date of Patent: May 31, 2022

(54) BOXED HEADER FOR AIR-COOLED HEAT EXCHANGER

(71) Applicant: Hudson Products Corporation, Ball Ground, GA (US)

(72) Inventors: Brian Weaver, Tulsa, OK (US); Allen James, Tulsa, OK (US); Danny Waters, Tulsa, OK (US)

(73) Assignee: Hudson Products Corporation, Ball Ground, GA (US)

( * ) Notice: Subject to any disclaimer, the term of this patent is extended or adjusted under 35 U.S.C. 154(b) by 102 days.

(21) Appl. No.: 16/254,181

(22) Filed: Jan. 22, 2019

Related U.S. Application Data

(60) Provisional application No. 62/620,297, filed on Jan. 22, 2018.

(51) Int. Cl.
| | | |
|---|---|---|
| *F28F 9/02* | (2006.01) | |
| *B23P 15/26* | (2006.01) | |
| *B23P 15/00* | (2006.01) | |

(52) U.S. Cl.
CPC ............ *F28F 9/02* (2013.01); *B23P 15/00* (2013.01); *B23P 15/26* (2013.01); *F28F 2275/06* (2013.01)

(58) Field of Classification Search
CPC .......... B23P 15/26; B23K 33/004; F28F 9/02
See application file for complete search history.

(56) References Cited

U.S. PATENT DOCUMENTS

| | | | | |
|---|---|---|---|---|
| 2,747,065 A | * | 5/1956 | Diehl ..................... | B23K 9/164 219/61 |
| 3,192,079 A | * | 6/1965 | Takagi ................... | B23K 9/188 219/73 |
| 4,041,270 A | * | 8/1977 | Akahide ................ | B23K 9/188 228/175 |
| 4,624,379 A | * | 11/1986 | Rothenbucher ........... | F28F 9/02 220/4.12 |
| 5,004,884 A | * | 4/1991 | Sakaguchi .............. | B23K 9/18 219/137 R |
| 5,159,175 A | * | 10/1992 | Loeber .................... | B23K 9/02 219/137 R |
| 6,155,339 A | * | 12/2000 | Grapengater ............. | F28F 9/02 165/173 |

(Continued)

FOREIGN PATENT DOCUMENTS

| | | | | |
|---|---|---|---|---|
| CA | 2213787 A1 | * | 2/1998 | |
| EP | 1518633 B1 | * | 4/2008 | ............. B23K 26/24 |

OTHER PUBLICATIONS

EP1518633B1 Machine Translation (Year: 2008).*

*Primary Examiner* — Jacob J Cigna
*Assistant Examiner* — Michael W Hotchkiss
(74) *Attorney, Agent, or Firm* — Cook Alex Ltd.

(57) ABSTRACT

A boxed header is formed from an exterior side plate, an interior side plate, a top plate, a bottom plate, a first end plate and a second end plate. The top plate is connected to the exterior side plate and the interior side plate with welded joints that are formed at the juncture between J-beveled top edges on the exterior side plate and the interior side plate that support the weight of the top plate during assembly. Once the top plate has been secured, the boxed header can be rotated and the bottom plate is attached to the exterior side plate and the interior side plate with welded joints that are formed at the juncture between J-beveled bottom edges on the exterior side plate and the interior side plate that support the weight of the bottom plate during assembly.

9 Claims, 3 Drawing Sheets

(56) References Cited

U.S. PATENT DOCUMENTS

| | | | | |
|---|---|---|---|---|
| 6,523,260 | B2* | 2/2003 | Kelsey | B21D 53/02 29/890.03 |
| 7,921,495 | B2* | 4/2011 | Inose | B23K 33/004 14/77.3 |
| 9,587,892 | B2* | 3/2017 | Togo | B23K 33/004 |
| 10,245,685 | B2* | 4/2019 | Simmons | B23K 31/02 |
| 2009/0280349 | A1* | 11/2009 | Bittendorfer | B23K 26/242 219/121.13 |
| 2013/0136540 | A1* | 5/2013 | Jones | F16L 1/12 219/61 |
| 2013/0140012 | A1 | 6/2013 | Al-Otaibi | |
| 2015/0251275 | A1* | 9/2015 | Denney | B23K 26/282 219/121.64 |
| 2017/0036302 | A1* | 2/2017 | Okuda | B23K 26/60 |
| 2020/0232723 | A1* | 7/2020 | Satin | B23K 15/0046 |

* cited by examiner

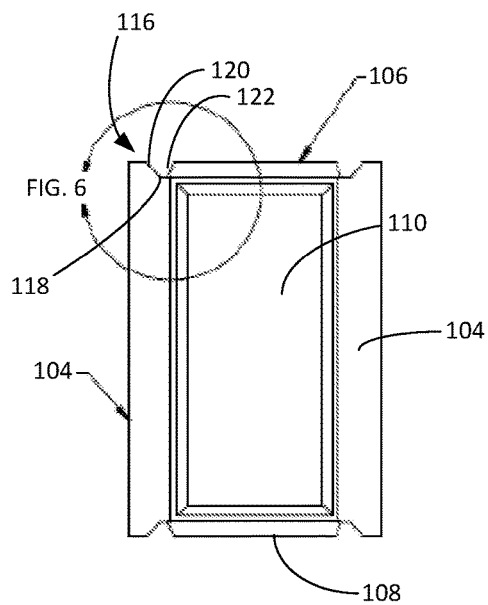
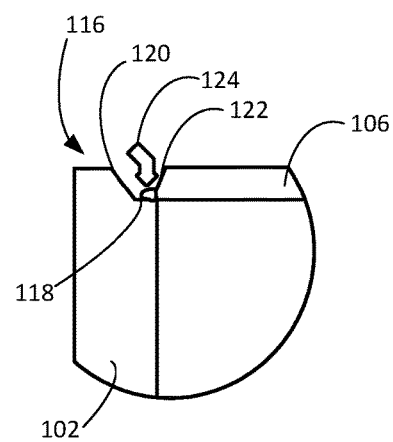
FIG. 6
FIG. 5
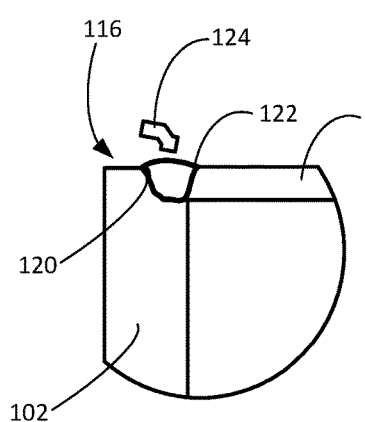
FIG. 7
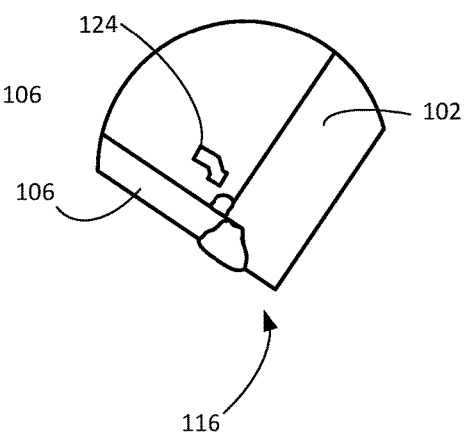
FIG. 8
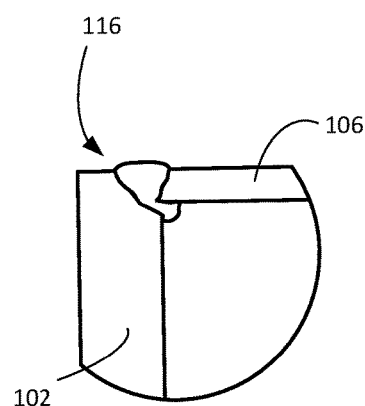
FIG. 9

BOXED HEADER FOR AIR-COOLED HEAT EXCHANGER

RELATED APPLICATIONS

This application claims the benefit of United States Provisional Patent Application No. 62/620,297 filed Jan. 22, 2018 and entitled "Improved Boxed Header for Air-Cooled Heat Exchanger," the disclosure of which is herein incorporated by reference.

FIELD OF THE INVENTION

The present invention generally relates to headers intended for use in connection with air-cooled heat exchangers, and more particularly, but not by way of limitation, to a boxed header with component parts configured to facilitate assembly and welding operations.

BACKGROUND OF THE INVENTION

Air-cooled heat exchangers are used in a wide variety of industrial applications. A process fluid, either a gas or a liquid, is passed through a series of cooling tubes while air is mechanically passed over the exterior of the cooling tubes. The air absorbs heat from the cooling tubes, thereby lowering the temperature of the fluid within the tubes. The cooling tubes may include lateral or axial fins to aid in heat transfer.

Heat exchangers typically include two header boxes having the cooling tubes extending there between. The header boxes further include an inlet or an outlet to permit the flow of the process fluid through the heat exchanger. In many applications, the process fluid is under elevated temperatures and pressures. To safely contain the elevated pressure of the process fluid, the header boxes are manufactured by welding metal plates together. To ensure that the header boxes are capable of prolonged exposure to the elevated pressures of the process fluid, the header boxes are typically inspected using radiographic or other weld inspection techniques.

In the past, these header boxes have been welded together using V-beveled plates that are positioned in a spaced-apart relationship with an "open root" to encourage full penetration of the weld. Although widely accepted, the prior art method of using a non-contact, open root weld can significantly increase manufacturing costs. In particular, pre-assembling the various plates of the prior art boxed header with precise tolerances takes significant time and experience. Even when properly assembled and spaced, the welding required to join the various plates is time consuming and demanding. Accordingly, there is a need for an improved boxed header that is capable of withstanding elevated pressures and that is more easily manufactured and welded. The presently preferred embodiments are directed to these and other deficiencies in the prior art.

SUMMARY OF THE INVENTION

In one aspect, the present invention includes a boxed header that is formed from an exterior side plate, an interior side plate, a top plate, a bottom plate, a first end plate and a second end plate. The top plate is connected to the exterior side plate and the interior side plate with welded joints that are formed at the juncture between J-beveled top edges on the exterior side plate and the interior side plate that support the weight of the top plate during assembly. Once the top plate has been secured, the boxed header can be rotated and the bottom plate is attached to the exterior side plate and the interior side plate with welded joints that are formed at the juncture between J-beveled bottom edges on the exterior side plate and the interior side plate that support the weight of the bottom plate during assembly.

In another aspect, the present invention includes a method for making a boxed header. The method includes the steps of providing an exterior side plate that has a top side, a bottom side and a length, wherein the top side and bottom side of the exterior side plate each includes a J-beveled edge extending along the length of the exterior side plate, wherein each J-beveled edge includes a horizontal landing ledge and an upright face. The method continues with providing an interior side plate opposite to the exterior side plate, wherein the interior side plate has a top side, a bottom side and a length, and wherein the top side and bottom side of the interior side plate each includes a J-beveled edge extending along the length of the interior side plate, wherein each J-beveled edge includes a horizontal landing ledge and an upright face.

Next, the method continues with the step of positioning a top plate between the exterior side plate and the interior side plate such that the top plate rests on the horizontal landing ledges of the J-beveled edges of the top side of the exterior side plate and the top side of the interior side plate. The method then continues with the steps of welding the top plate to the exterior side plate and welding the top plate to the interior side plate.

In some embodiments, the step of welding the top plate to the interior side plate optionally includes one or more of the steps of positioning a welding probe outside the boxed header in functional proximity to both the top plate and the horizontal landing ledge of the top side of the interior side plate, making a root pass weld with the welding probe along substantially the entire length of the interior side plate, positioning the welding probe outside the boxed header in functional proximity to the root pass weld, making one or more filler pass welds between the top plate and the J-beveled edge of the top side of the interior side plate, positioning the welding probe inside the boxed header in functional proximity to both the top plate and the interior side plate, and making an internal pass weld with the welding probe along substantially the entire length of the interior side plate.

In another aspect, the present invention includes a boxed header for use in a heat exchanger. The boxed header includes an interior side plate having a top side, a bottom side and a length, wherein the top and bottom sides of the interior side plate each include a J-beveled edge extending along the length of the interior side plate. The boxed header also includes an exterior side plate having a top side, a bottom side and a length, wherein the top and bottom sides of the exterior side plate each include a J-beveled edge extending along the length of the exterior side plate. The boxed header also has an upper plate extending between the exterior side plate and the interior side plate, wherein the upper plate has a width, a length and side edges, wherein the upper plate contacts the J-beveled edges on the top sides of the exterior side plate and the interior side plate. The boxed header further includes a lower plate extending between the exterior side plate and the interior side plate, wherein the lower plate has a width, a length and side edges, wherein the lower plate contacts the J-beveled edges on the bottom sides of the exterior side plate and the interior side plate.

In yet another aspect, the present invention includes a boxed header for use in a heat exchanger, where the boxed header has an exterior side plate that has J-beveled top and bottom edges and an interior side plate that has J-beveled top and bottom edges. The boxed header further includes a top plate extending between the top edges of the exterior side plate and the interior side plate, wherein the top plate has V-beveled side edges, wherein the top plate is connected to the top edges of the exterior side plate and the interior side plate with welded joints that cover the J-beveled top edges of the exterior and interior side plates and the V-beveled edges of the top plate. The boxed header also includes a bottom plate extending between the bottom edges of the exterior side plate and the interior side plate, wherein the bottom plate has V-beveled side edges, and wherein the bottom plate is connected to the bottom edges of the exterior side plate and the interior side plate with welded joints that cover the J-beveled bottom edges of the exterior and interior side plates and the V-beveled edges of the bottom plate.

BRIEF DESCRIPTION OF THE DRAWINGS

FIG. 5 is an end view of the boxed header of FIG. 1.

FIG. 6 is a close-up view of the connection of the exterior side plate and top plate of FIG. 5 during a first (root) welding pass on the exterior of the boxed header.

FIG. 7 is a close-up view of the connection of the exterior side plate and top plate during a second welding pass, showing a fully-capped exterior weld.

FIG. 8 is a close-up view of the connection of the exterior side plate and top plate with the boxed reoriented with the internal V joint in the vertical position, during an internal welding pass.

FIG. 9 provides a close-up view of the connection of the exterior side plate and top plate showing the full penetration resulting from the single-pass internal weld tie-in to the exterior weld.

WRITTEN DESCRIPTION

Figure 1:
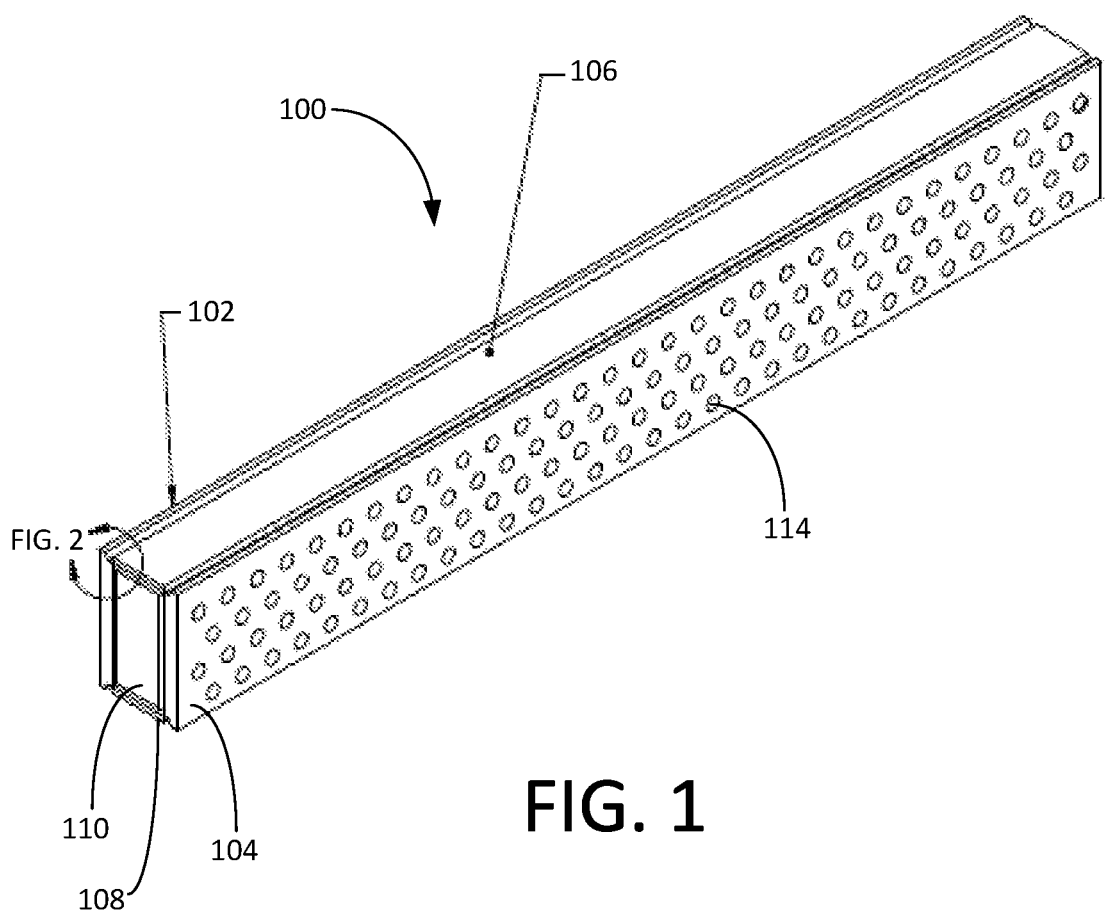
FIG. 1 is an interior side perspective view of a boxed header constructed in accordance with an embodiment of the present invention.

Referring first to FIG. 1, shown therein is an interior perspective view of a boxed header 100 constructed in accordance with an exemplary embodiment of the present invention. It will be appreciated by those skilled in the art that the boxed header 100 is generally suited for use in an air-cooled heat exchanger (not shown). The boxed header generally includes an exterior side plate 102, an interior side plate 104, a top plate 106, a bottom plate 108, a first end plate 110 and a second end plate 112 (not visible in FIG. 1) opposite the first end plate 110. Although the relative dimensions of these components of the boxed header 100 are depicted as creating an elongate box with a rectangular cross-section, it will be appreciated that in alternate embodiments, the boxed header 100 can be configured in different shapes and configurations.

Although not shown in FIG. 1, it will be further noted that most heat exchangers will include a plurality of headers that are interconnected by a plurality of finned cooling tubes (not shown). For example, the boxed header 100 depicted in FIG. 1 can be duplicated and oriented such that the interior side plates 104 of the two boxed headers 100 face one another. As noted in FIG. 1, the interior side plate 104 includes a plurality of tube apertures 114 that are sized and configured to accept and retain the finned cooling tubes.

Figure 2:
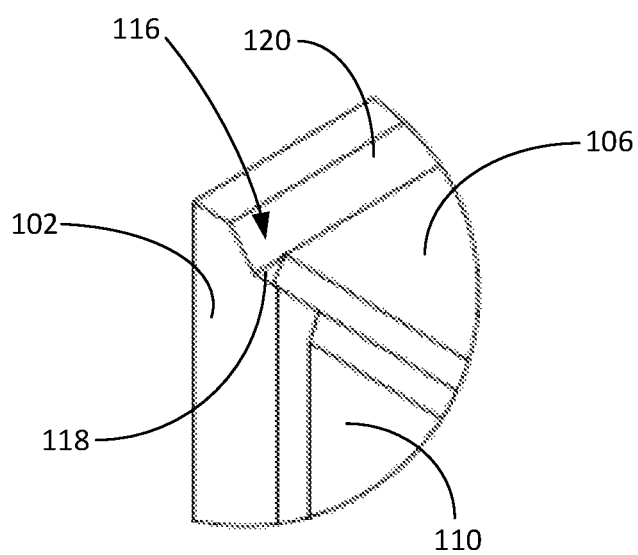
FIG. 2 is a close-up of the pre-welded connection of the exterior side plate, top plate and first end plate the boxed header of FIG. 1.
Figure 3:
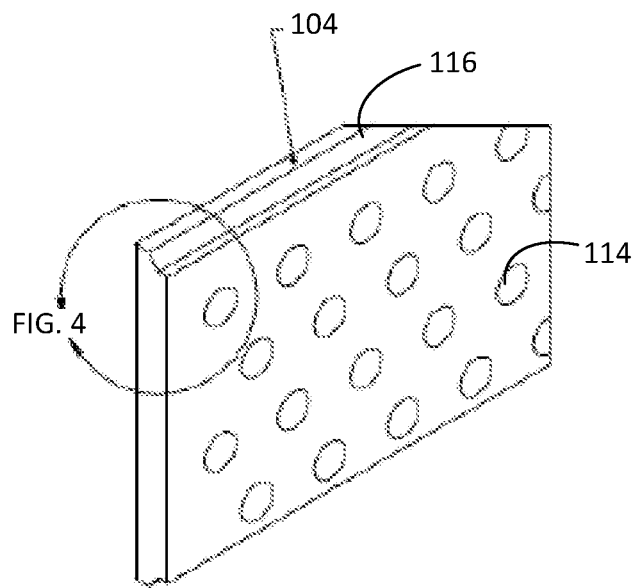
FIG. 3 is a partial interior view of the interior side plate of the boxed header of FIG. 1.
Figure 4:
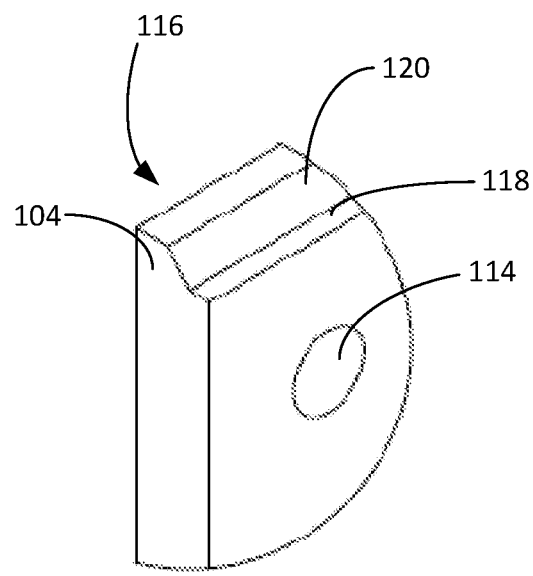
FIG. 4 is a close-up view of the J-beveled edge of the interior side plate of FIG. 3.

Turning to FIG. 2, shown therein is a close-up depiction of the connection between the top plate 106, the exterior side plate 102 and the first end plate 110. Unlike prior art boxed header designs, the exterior side plate 102 is provided with a J-beveled edge 116 extending along the top and bottom sides of the exterior side plate 102. As noted in FIGS. 3 and 4, the interior side plate 104 is also provided with J-beveled top and bottom edges 116. The J-beveled edge 116 includes a substantially horizontal landing ledge 118 and an upright face 120 that extends up from the landing ledge 118 at an obtuse angle.

Turning to FIGS. 5-8, shown therein are end views of the boxed header 100. As depicted in FIG. 5, the both sides of the top plate 106 and bottom plate 108 have V-beveled edges 122. In this way, the cross-section of the top and bottom plates 106, 108 resemble parallelograms. When assembled, the top plate 106 and bottom plate 108 are in contact with the landing ledge 118 of the J-beveled edges 116 on the top and bottom sides of each of the interior side plate 104 and exterior side plate 102. In this position, the V-beveled edges 122 of the top and bottom plates 106, 108 form closed root joints with the J-beveled edges 116 of the exterior and interior side plates 102, 104. The closed root joints extend along the length of the boxed header 100 (as best seen in FIG. 1).

The ability to place the top plate 106 and bottom plate 108 into positive contact with the J-beveled edges 116 of the exterior and interior side plates 102, 104 significantly facilitates the pre-welding assembly of the boxed header 100. In particular, the top plate 106 and bottom plate 108 can be positioned relative to the exterior and interior side plates 102, 104 without the external bracing components and precise spacing adjustments that would ordinarily be required in an open root connection. Although the J-beveled edges 116 have been disclosed as being located on the top and bottom edges of the exterior and interior side plates, it will be appreciated the J-beveled edges 116 could also be located on the top and bottom plates 106, 108 in place of the V-beveled edges 122. In yet another embodiment, the exterior and interior side plates 102, 104 could be provided with top and bottom V-beveled edges 122 and the top and bottom plates 106, 108 could be provided with J-beveled edges 116.

In an exemplary method of construction, the process begins by externally clamping the top plate 106 and bottom plate 108 with the exterior side plate 102 and interior side plate 104. The top plate 106 and bottom plate 108 are each placed into positive contact with the exterior side plate 102 and interior side plate 104. Next, as indicted in FIG. 6, a welding probe 124 is positioned on the outside of the boxed header 100 in contact or functional proximity with the J-beveled edges 116 and V-beveled edges 122, and an initial "root" welding pass is performed. With this "root" pass, a partial penetration of the joint is achieved through the reduced cross-sectional area created at the intersection of the horizontal landing ledge 118 of the J-beveled edges 116 and the V-beveled edges 122. In exemplary embodiments, the welding probe 124 is a submerged arc welder (SAW) that is applied by an automated welding machine. In some embodiments, all four root joints between the exterior and interior side plates 102, 104 and top and bottom plates 106, 108 are welded in sequence. Once the "root" pass has been completed, subsequent filler passes can be made by the welding probe 124 to fill in any voids remaining in the joint between the upright face 120 and V-beveled edge 122, as indicated in FIG. 7. For these welds, the welding probe is positioned on the outside of the boxed header 100.

Once all four long seam joints between the top and bottom plates 106, 108 and the exterior and interior side plates 102, 104 have been filled to remove voids and full cap height is achieved, the boxed header 100 is then repositioned to weld the inside of these long seam joints, as depicted in FIG. 8. In exemplary embodiments, the boxed header 100 is rotated such that each internal "V" joint is placed in a substantially vertical orientation, as noted in FIG. 8. The welding probe 124 is then located to the position of the "nugget" created by the root pass, as shown in FIG. 6. A single internal pass for each joint using an automated submerged arc welder (SAW) is then performed. This single pass ties the internal weld joint to the external root pass and a full penetration joint is achieved, as illustrated in FIG. 9.

Once the top and bottom plates 106, 108 have been welded to the exterior and interior side plates 102, 104, the first and second end plates 110, 112 can be positioned near the ends of the boxed header 100 and secured using conventional bracing and welding techniques applied from the exterior of the boxed header 100. In exemplary embodiments, the first and second end plates 110, 112 are provided with beveled edges to improve weld penetration with the flat interior surfaces of the top and bottom plates 106, 108 and exterior and interior side plates 102, 104.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein and within the appended claims. It will be appreciated by those skilled in the art that the teachings of the present invention can be applied to other systems without departing from the scope and spirit of the present invention.

It is claimed:

1. A method for making a boxed header, the method comprising the steps of: providing an exterior side plate that has a top side, a bottom side and a length, wherein the top side and bottom side of the exterior side plate each includes a J-beveled edge extending along the length of the exterior side plate, wherein each J-beveled edge includes a horizontal landing ledge and an upright face; providing an interior side plate opposite to the exterior side plate, wherein the interior side plate has a top side, a bottom side and a length, and wherein the top side and bottom side of the interior side plate each includes a J-beveled edge extending along the length of the interior side plate, wherein each J-beveled edge includes a horizontal landing ledge and an upright face; providing a top plate having a V-beveled exterior side edge and a V-beveled interior side edge; positioning the top plate between the exterior side plate and the interior side plate such that an underside of the V-beveled exterior side edge of the top plate rests on the horizontal landing ledge of the J-beveled edge of the top side of the exterior side plate resulting in formation of a first closed root joint at an intersection of the top plate with the top side of the exterior side plate and an underside of the V-beveled interior side edge of the top plate rests on the horizontal landing ledge of the J-beveled edge of the top side of the interior side plate resulting in formation of a second closed root joint at an intersection of the top plate with the top side of the interior side plate; said first closed root joint being spaced from the upright face of the J-beveled edge of the top side of the exterior side plate so that the first closed root joint has a first reduced cross-sectional area and said second closed root joint being spaced from the upright face of the J-beveled edge of the top side of the interior side plate so that the second closed root joint has a second reduced cross-sectional area; positioning a welding probe between the V-beveled exterior side edge of the top plate and the upright face of the J-beveled edge of the top side of the exterior side plate in functional proximity to the first closed root joint; welding the top plate to the exterior side plate including making a first root pass weld with the welding probe along the length of the exterior side plate so that partial penetration of the first closed root joint is created through the first reduced cross-sectional positioning a welding probe between the V-beveled interior side edge of the top plate and the upright face of the J-beveled edge of the top side of the interior side plate in functional proximity to the second closed root joint; welding the top plate to the interior side plate including making a second root pass weld with the welding probe along the length of the interior side plate so that partial penetration of the second closed root joint is created through the second reduced cross-sectional area.

2. The method of claim 1, wherein the step of welding the top plate to the interior side plate further comprises the steps of: positioning the welding probe outside the boxed header in functional proximity to the second root pass weld; making one or more filler pass welds between the top plate and the J-beveled edge of the top side of the interior side plate; positioning the welding probe inside the boxed header in functional proximity to both the top plate and the interior side plate; and making an internal pass weld with the welding probe along substantially the entire length of the interior side plate.

3. The method of claim 1, wherein the step of welding the top plate to the exterior side plate further comprises the step of: positioning the welding probe outside the boxed header in functional proximity to the first root pass weld; and making one or more filler pass welds between the top plate and the J-beveled edge of the top side of the exterior side plate.

4. The method of claim 3, wherein the step of welding the top plate to the exterior side plate further comprises the steps of:
    positioning the welding probe inside the boxed header in functional proximity to both the top plate and the exterior side plate; and
    making an internal pass weld with the welding probe along substantially the entire length of the exterior side plate.

5. The method of claim 1, further comprising the steps of:
    rotating the exterior side plate, interior side plate and top plate to orient the top plate below the horizontal landing ledges of the top sides of the exterior side plate and interior side plate;
    positioning a bottom plate between the exterior side plate and the interior side plate such that the bottom plate rests on the J-beveled edges of the bottom side of the exterior side plate and the bottom side of the interior side plate;
    welding the bottom plate to the exterior side plate; and
    welding the bottom plate to the interior side plate.

6. The method of claim 5, wherein the step of welding the bottom plate to the interior side plate further comprises the steps of: positioning the welding probe outside the boxed header in functional proximity to both the bottom plate and the horizontal landing ledge of the bottom side of the interior side plate; making a third root pass weld with the welding probe along substantially the entire length of the interior side plate; positioning the welding probe outside the boxed header in functional proximity to the root pass weld; making one or more filler pass welds between the bottom plate and the J-beveled edge of the bottom side of the interior side plate; positioning the welding probe inside the boxed header in functional proximity to both the bottom plate and the interior side plate; and making an internal pass weld with the welding probe along substantially the entire length of the interior side plate.

7. The method of claim 5, wherein the step of welding the bottom plate to the exterior side plate further comprises the steps of: positioning the welding probe outside the boxed header in functional proximity to both the bottom plate and the horizontal landing ledge of the bottom side of the exterior side plate; making a fourth root pass weld with the welding probe along substantially the entire length of the exterior side plate; positioning the welding probe outside the boxed header in functional proximity to the root pass weld; making one or more filler pass welds between the bottom plate and the J-beveled edge of the bottom of the exterior side plate; positioning the welding probe inside the boxed header in functional proximity to both the bottom plate and the exterior side plate; and making an internal pass weld with the welding probe along substantially the entire length of the exterior side plate.

8. The method of claim 5, further comprising the steps of: positioning a first end plate between the exterior side plate, interior side plate, top plate and bottom plate; and welding the first end plate to the exterior side plate, interior side plate, top plate and bottom plate.

9. The method of claim 8, further comprising the steps of: positioning a second end plate between the exterior side plate, interior side plate, top plate and bottom plate; and welding the second end plate to the exterior side plate, interior side plate, top plate and bottom plate.

* * * * *